March 15, 1938. H. AUSLANDER 2,110,981
COVER FOR FLOWERPOTS AND THE LIKE
Filed June 18, 1936

INVENTOR
Henry Auslander
BY
Zoltan Holacheko
ATTORNEY

Patented Mar. 15, 1938

2,110,981

UNITED STATES PATENT OFFICE 2,110,981

COVER FOR FLOWERPOTS AND THE LIKE

Henry Auslander, New York, N. Y.

Application June 18, 1936, Serial No. 85,857

6 Claims. (Cl. 41—10)

This invention relates to new and useful improvements in a cover for flower pots and the like.

The invention has for an object the construction of a cover which is characterized by the fact that it has a plurality of adjacent substantially free members arranged in the surface of an imaginary frusto of a cone and connected together with elastic elements so as to be engaged against the outer face of the wall of a flower pot.

More specifically, the invention contemplates constructing each of the upright members with an outer wall connecting with radial walls for engaging the sides of the flower pot to form a passage between the sides of the flower pot and said outer wall for the overflow when water is placed into the flower pot.

A further object of the invention resides in fashioning the edges of the radial wall so as to fit the contour of the flower pot.

Still further the invention contemplates an arrangement whereby the substantially upright members are supported in the said imaginary surface.

Still further the invention proposes an arrangement for adjustably supporting the upright members relative to each other to adapt the cover to flower pots having sloping walls of different degrees.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

The cover for flower pots and the like, according to this invention, comprises a plurality of adjacent substantially upright members 10 arranged in the surface of an imaginary frusto of a cone and held together in a unit by bands 11 and 12. Each of the members 10 consists of an outer wall 10$^a$ connecting with radial walls 10$^b$ adapted to engage the sides of the flower pot to form a passage between the sides of the flower pot and said outer wall 10$^a$ for the overflow from the flower pot to pass.

Figure 5:
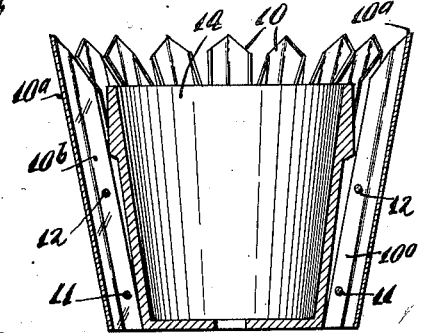
Fig. 5 is a transverse sectional view of the cover shown in Fig. 1 applied to a flower pot.

Preferably, the members 10 should be constructed of Cellophane or other similar waterproof materials. It is then possible to readily wash the cover. The bands 11 and 12 are elastic bands which permit the cover to be stretched when engaged in position on a flower pot. An arrangement is provided for holding the member 10 in proper position. This arrangement consists of beads 13 strung upon the uppermost band 12 and disposed between the sides of adjacent members 10 to produce the flaring effect which forms the imaginary frusto of a cone. In Fig. 5 a flower pot 14 is illustrated to which the cover has been applied.

Figure 6:
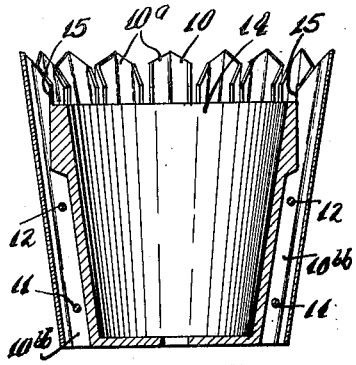
Fig. 6 is a view similar to Fig. 5 but illustrating a modified form of the device in which the radial walls are fashioned to fit the contour of the flower pot.
Figure 7:
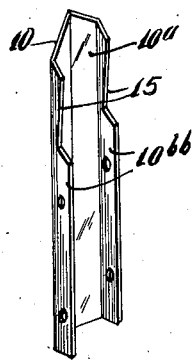
Fig. 7 is a perspective view of one of the upright members shown in Fig. 6.

In Figs. 6 and 7 a modification of the invention is disclosed in which the side walls 10$^{bb}$ of the upright members are formed with cutout portions 15 adapted to fit the contour of the flower pot 14 as clearly shown in Fig. 6. In other respects this form of the invention is identical to the previous form and the same parts may be recognized by the identical reference numerals.

Figure 8:
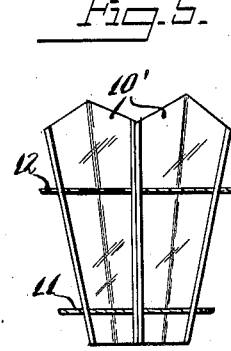
Fig. 8 is a fragmentary interior elevational view of a portion of a flower pot constructed according to another embodiment of the invention.

In Fig. 8 another modified form of the invention has been disclosed in which each of the upright members 10' are cut or formed so as to be wider at the top than at the bottom. Thus, it is possible to obtain the frusto conical shape without the use of beads, as illustrated in the previous form. In other respects this form of the invention is similar to the previous form and the same parts may be recognized by the corresponding reference numerals.

Figure 1:
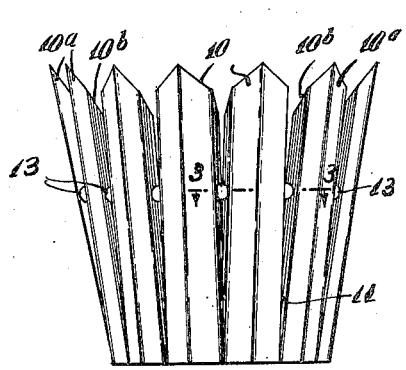
Fig. 1 is a side elevational view of a cover constructed according to this invention.
Figure 2:
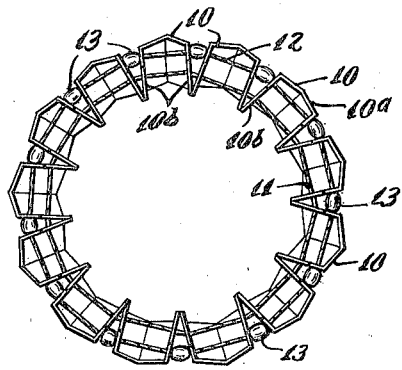
Fig. 2 is a plan view of Fig. 1.
Figure 3:
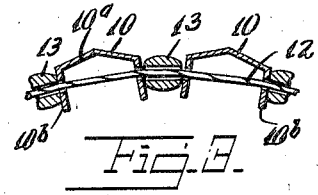
Fig. 3 is a fragmentary horizontal sectional view taken on the line 3—3 of Fig. 1.
Figure 11:
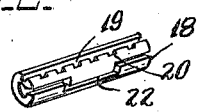
Fig. 11 is a perspective view of one of the separating elements shown in Fig. 9.
Figure 4:
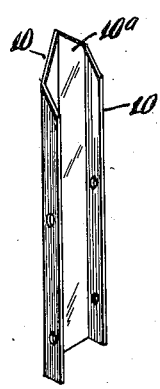
Fig. 4 is a perspective view of one of the upright members.
Figure 9:
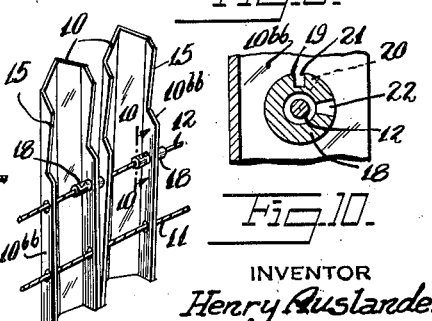
Fig. 9 is a perspective view of a portion of a flower pot constructed according to another modification of the invention, this view being seen as though looking from the interior of the cover.
Figure 10:
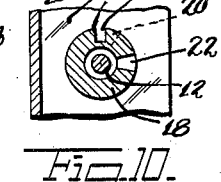
Fig. 10 is a fragmentary enlarged sectional view taken on the line 10—10 of Fig. 9.

In Figs. 9–11 inclusive another modified form of the invention has been disclosed in which adjustable elements 18 are provided for holding the upright members in relatively inclined positions to produce the conical effect. Specifically, each of the members 18 comprises a tubular element which is formed with a longitudinal groove 19 in its outer face and extending from end to end. This longitudinal groove has small transverse branches 20. A tongue element 21 is formed in the side wall of the vertical member and engages in the groove 19 and is adapted to engage in the branches 20 upon slight rotation of the element 18. The element 18 is extended through the radial wall of the upright member and may be extend to various amounts, as desired.

Furthermore, the element 18 is formed with a zig-zag cut 22 extending completely through the wall thereof and from one end to the other end. This zig-zag cut 22 is of sufficient width to permit the band 12 to pass through, provided of course the band is out of its natural straight line and formed into the zig-zag formation. It is thus possible to remove the element 18 from the band when desired.

Each of the upright members is provided with one of the elements 18 which may be extended to various degrees and abut the adjacent member for holding the upright members in relative angular positions. These relative positions may be varied as controlled by the branches 20.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A cover for flower pots and the like, comprising a plurality of adjacent substantially upright members arranged in the surface of an imaginary frusto of a cone, means for holding said members as a unit, and each member consisting of an outer wall connecting with radial walls for engaging the sides of the flower pot to form a passage between the sides of the flower pot and said outer wall for overflow when water is placed into the flower pot, said radial walls having their edges fashioned to fit the contour of the flower pot.

2. A cover for flower pots and the like, comprising a plurality of adjacent substantially upright members arranged in the surface of an imaginary frusto of a cone, means for holding said members as a unit, each member consisting of an outer wall connecting with radial walls for engaging the sides of the flower pot to form a passage between the sides of the flower pot and said outer wall for overflow when water is placed into the flower pot, said holding means comprising elastic bands engaging through the radial walls, and beads upon certain of said bands and disposed between adjacent radial walls for holding the upright members in the frusto conical shape.

3. A cover for flower pots and the like, comprising a plurality of adjacent substantially upright members arranged in the surface of an imaginary frusto of a cone, means for holding said members as a unit, and each member consisting of an outer wall connecting with radial walls for engaging the sides of the flower pot to form a passage between the sides of the flower pot and said outer wall for overflow when water is placed into the flower pot, said means for holding the members comprising elastic bands, and elements upon one of said bands and adjustably mounted through the radial walls of the upright members and adapted to abut the adjacent walls of adjacent upright members.

4. A cover for flower pots and the like, comprising a plurality of adjacent substantially upright members arranged in the surface of an imaginary frusto of a cone, means for holding said members as a unit, and each member consisting of an outer wall connecting with radial walls for engaging the sides of the flower pot to form a passage between the sides of the flower pot and said outer wall for overflow when water is placed into the flower pot, said means for holding the members comprising elastic bands, and elements upon one of said bands and adjustably mounted through the radial walls of the upright members and adapted to abut the adjacent walls of adjacent upright members, said elements being formed with a longitudinal slot having offset branches engageable by teeth elements from the said radial walls.

5. A cover for flower pots and the like, comprising a plurality of adjacent substantially upright members arranged in the surface of an imaginary frusto of a cone, means for holding said members as a unit, and each member consisting of an outer wall connecting with radial walls for engaging the sides of the flower pot to form a passage between the sides of the flower pot and said outer wall for overflow when water is placed into the flower pot, said means for holding the members comprising elastic bands, and elements upon one of said bands and adjustably mounted through the radial walls of the upright members and adapted to abut the adjacent walls of adjacent upright members, said elements being formed with a longitudinal slot having offset branches engageable by teeth elements from the said radial walls, and each of said elements being formed with a zig-zag cut extending from end to end through which the band may be removed when bent into the zig-zag formation.

6. A cover for flower pots and the like, comprising a plurality of adjacent substantially upright members formed with inturned edges having apertures therethrough, and a resilient means passing through said apertures to connect said members together with a portion of the sides of said inturned edges adjacent each other and the ends of said inturned edges abutting the outside surface of said flower pot to hold the members together and to simultaneously force them against the outer face of said flower pot and so adapt the cover for flower pots of slightly different sizes, and an adjustable means for holding said members in the frusto of a cone, comprising a tongue associated with one of said apertures, a hollow tubular member mounted on one of said resilient means and adapted to pass through an aperture in one of said members and abut the side of a second member to hold said members spaced, said tubular member being formed with a longitudinal slot having offset branches adapted to engage said tongue to hold said tubular member in adjusted positions and so hold said members in a partial spaced condition.

HENRY AUSLANDER.